Aug. 26, 1969 T. W. MARTINEK 3,462,794
FLUID APPLICATOR FOR SHIRRING MACHINE
Filed Dec. 29, 1966 4 Sheets-Sheet 1

INVENTOR.
THOMAS W MARTINEK
BY
*Neal J Mosely*
his attorney

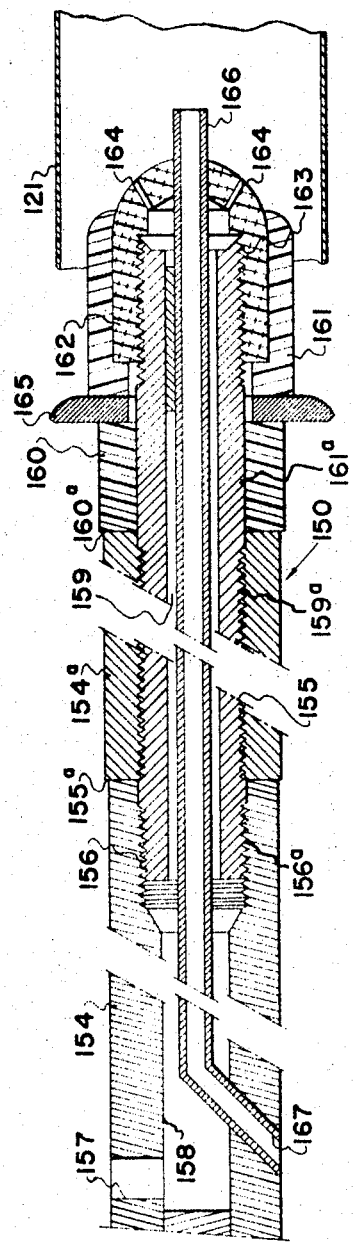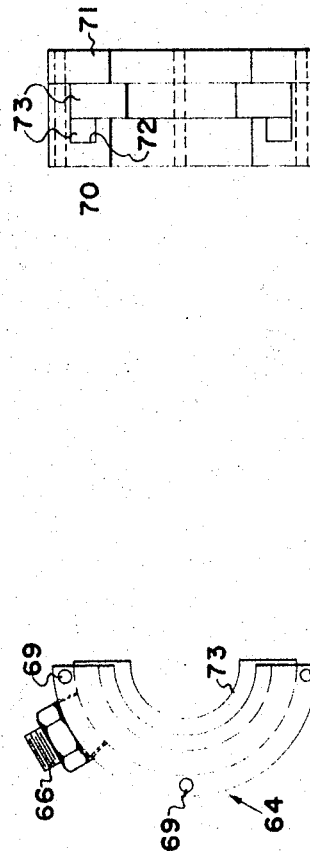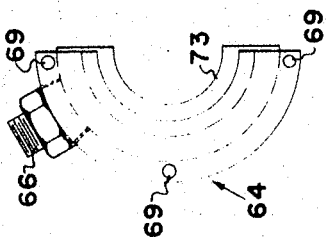

Aug. 26, 1969  T. W. MARTINEK  3,462,794
FLUID APPLICATOR FOR SHIRRING MACHINE
Filed Dec. 29, 1966  4 Sheets-Sheet 4

BY
THOMAS W MARTINEK
*INVENTOR.*

*Neal J. Mosely*
his attorney

United States Patent Office 3,462,794
Patented Aug. 26, 1969

3,462,794
FLUID APPLICATOR FOR SHIRRING MACHINE
Thomas W. Martinek, Danville, Ill., assignor to Tee-Pak, Inc., a corporation of Illinois
Filed Dec. 29, 1966, Ser. No. 605,669
Int. Cl. A22c 11/00, 15/00
U.S. Cl. 17—42                      9 Claims

ABSTRACT OF THE DISCLOSURE

In the shirring of synthetic sausage casings, e.g. regenerated cellulose, amylose, alginate, collagen casings, etc., wherein a flattened tubular casing is fed from a storage reel, inflated, and shirred mechanically, metered amounts of fluid, such as water, are applied uniformly to the casing by a porous capillary applicator contacting the casing after leaving the storage reel and prior to the point where the shirred product is discharged from the shirring apparatus. In one preferred embodiment, the fluid is applied to the casing by applicators which are moved out of contact with the casing when the shirring apparatus is stopped. In other embodiments, the shirring apparatus may be operated continuously and the applicators maintained in continuous contact with the casing.

Background of the invention

This invention relates to new and useful improvements of shirring of artificial sausage casings and more particularly to the application of fluids to sausage casings in the shirring process.

Artifiicial sausage casings, particularly casings formed from regenerated cellulose, are prepared as hollow, thin-walled tubes of very great length. For convenience in handling, these casings are shirred from lengths ranging from 40 to 160 feet or more down to a shirred and compressed length of the order of a few inches. An early type shirring machine and the resulting shirred product are shown in Dietrich U.S. Patent 2,010,626. Improved forms of shirring machines and the products thereof are shown in Korsgaard U.S. Patent 2,583,654; Blizzard et al. U.S. Patents 2,722,714, 2,722,715 and 2,723,201; Gimbel U.S. Patent 2,819,488; and Matecki U.S. Patents 2,983,949 and 2,984,574.

In the preparation and use of artificial sausage casings, particularly casings formed from regenerated cellulose, the moisture content of the casings has been of extreme importance. When the casings are first formed, it is necessary that they be dried to a relatively low water content, e.g. 8 to 10%. A lower water content in the casing generally results in damage to the casing during the shirring operation and sometimes makes shirring completely impossible. Similarly, a high water content in the casing has resulted in casing damage during shirring, usually resulting from the casing sticking to the shirring mandrel.

After a casing is shirred, it is packaged and shipped to a meat packing house where an individual shirred strand is placed on a stuffing horn and a meat emulsion extruded to fill the casing to its fully extended length. The stuffing of the casing usually takes place within a few seconds, with the results that the casing is extended from a shirred length of about 8 to 27 in. to an extended length of 40 to 160 ft. or more during a matter of 3 to 12 sec. This rapid extension of the casing during stuffing requires that the casing be especially strong and resistant to breakage. If even minor holes develop in the casing, the casing may split or break during stuffing and/or cooking causing waste or the reworking of a substantial quantity of meat.

In the shirring of artificial sausage casings, the pleats which are formed are sometimes interlocked and are almost always nested in a concave manner to provide a tightly compressed strand of casing for shipment and handling. The tightly compressed and sometimes interlocked pleats require a higher moisture content to permit extension of the casing during the stuffing operation without tearing or breaking the casing. In general, an average moisture content of 14 to 20% has been required, preferably about 17 to 18%, for clear regenerated cellulose casings. Slightly higher moisture contents may be used in the case of artificial sausage casings which have paper reinforcement. If the shirred casing has a moisture content appreciably less than about 14%, there is a tendency toward excessive breakage during stuffing. Likewise, if the casing has a moisture content in excess of about 20%, the casing is too plastic and may tend to over-stuff. It is, therefore, essential that the casing be humidified to a relatively narrow critical moisture content which is very uniform throughout the length of the casing to permit stuffing without excess breakage.

In the past, shirred artificial sausage casings have been packaged in cartons or containers which are apertured at opposite ends to permit circulation of moist air through the shirred casing strands to produce the desired moisture content in the casings.

When shirring machines of the type shown in Dietrich U.S. Patent 2,020,626 were in use, the shirred casings which were produced were accordion pleated but did not have nested concave pleates which were tightly compacted to provide shirred strands which were self supporting. As a result, the shirred casing strands had to be packaged in small individual packages which were easily removed from the strand at the packing house after insertion over the stuffing horn. These individual cartons were apertured on both ends, and the packaged casings were humidified by passing moist air through and over the casing strands. At a later date, a package was developed for shirred casings, as shown in Hewitt U.S. Patent 2,181,329 which had a plurality of apertures at opposite ends and which would contain a large number of shirred casings. The Hewitt package was designed to permit the packaging of a number of shirred casing strands while providing for circulation of moist air through and about the strands to bring the moisture content to the level required for satisfactory stuffing. An improvement on the shirred casing carton of Hewitt is described and claimed in Firth U.S. Patent 2,794,544. The Hewitt and Firth packages, however, are both subject to substantial objections in commercial use. These packages are expensive to make because of the spaced perforations required in the ends of the cartons and suffer from severe mechanical weakness in the perforated end walls which result in breakage of the end walls from time to time.

The development of improved shirring machines of the type shown in the Korsgaard, Blizzard et al., Gimbel and Matecki patents made possible the shirring of greater lengths of casing than has been previously possible. The Blizzard et al. shirring machines produced a shirred casing having accordion pleats which were tightly nested in a concave manner with the result that the shirred and compressed casing could be held without external support. As the casing industry has tended to produce longer and longer shirred strands, e.g. today strands up to 200 ft. are shirred, the problem of humidifying casing to the critical moisture content required for satisfactory stuffing has become increasingly difficult. In longer lengths of shirred casing, there is a considerable resistance to flow of moist air through the casing with the result that the ends of the casing tend to be more moist and the center of the casing less moist. Also, the moist air humidification technique has not been entirely practical for the humidification of heavy gauge casings and fibrous casings used for packaging of larger sausages and chunks and pieces of meats.

An additional problem that has arisen recently relates to the humidification of casings used for automatic stuffing machinery. Recently, machines have been developed and commercially introduced on a large scale in which sausage casings are handled automatically for stuffing and linking of the resulting stuffed sausage products. The introduction of these machines has required the development of shirred casing strands having one end of the strand closed so that the strands can be handled rapidly and stuffed without loss of meat emulsion through the end of the casing. When the ends of shirred casing strands are closed, it becomes difficult to humidify the shirred casing by the moist air circulation technique.

One solution to this problem has been the packaging of such casings in imperforate cartons with interspersed layers of moist pulp sheets which transfer moisture to the packaged casings. This technique is shown and described in Alsys U.S. Patent 3,271,168 and Turbak U.S. Patent 3,250,629. Another approach to the humidification of casing wherein the end of the shirred strand is to be closed involves the application of moisture to dry artificial sausage casing during the shirring process. This procedure is described in some detail in Arnold et al. U.S. Patent 3,222,192. The procedure described in the Arnold et al. patent involves the application of moisture to casing at some point in the shirring operation. The preferred point of application is at the feed-in belts or at the shirring belts or shirring wheels by application of water thereto.

In the Arnold et al. process, there are two disadvantages that were not appreciated at the time the process was developed. Most shirring machines operate intermittently. That is, a certain length of casing is shirred and the machine stopped and the shirred portion of casing severed and transferred within the machine. During the time that the shirring machine is stopped, it has been practically impossible to shut off the flow of water to the belts or wheels or rolls where the water is applied to the casing. This has resulted in the application of a large excess of water to a small section of the casing during the time that the machine is at rest. As a result, there is some tendency for casing damage resulting from excessive moisture in this position of the casing. Also, casing with a large excess of moisture presents additional problems during handling and stuffing. Another disadvantage was the difficulty of feeding uniform, accurate amounts of water to the casing when applied by the metering rolls, feed-in belts, or shirring wheels.

Summary of the invention

This invention comprises a new and improved apparatus for moistening synthetic sausage casings during the shirring process. More particularly, the invention comprises an improved applicator device for use on a shirring machine for application of water or other fluids to casing as it is inflated and fed over the shirring mandrel. One embodiment of the improved fluid applicator comprises a split collar capillary feed mechanism for supplying water or other liquid to contact the inflated casing being fed through the collar. When the movement of the casing is stopped, the split portions of the applicator separate and move out of contact with the casing so that an excess amount of water or other fluid is not fed onto the casing during stoppage. Another embodiment of the fluid applicator uses a pair of rolls having peripheral grooves which meet to encircle the casing and having a rolling contact with the casing. The rolls are preferably of a sponge or other capillary material to feed water or other fluid into contact with the casing. The rolls may operate continuously in a continuous shirring machine or may be moved out of contact with the casing during stoppage of an intermittently operated machine. The rolls may contact the inflated casing at the input side of the machine or the shirred casing strand while still on the mandrel after leaving the shirring zone. The apparatus also includes an improved arrangement for application of oil or other lubricant or of water to the interior of the casing during shirring. This feature comprises an improved washer arrangement positioned at the leading end of the shirring mandrel and arranged to wipe the interior of the casing after application of oil or other lubricant or water through the shirring mandrel. The improved fluid applicator and washer and mandrel construction may be used with any of a variety of shirring machines. The invention is shown in the drawings as applied to a shirring machine of the type generally shown in the Blizzard et al. patents and also to a shirring machine of the type generally shown in the Matecki patents.

Description of the drawings

In the accompanying drawings, to be taken as a part of this specification, there is clearly and fully illustrated a preferred embodiment of this invention, in which drawings:

FIG. 5 is an enlarged view of the applicator portion of the mechanism shown in FIGS. 3 and 4, FIG. 6 is a view in right elevation of the applicator member shown in FIG. 5, FIG. 7 is a cross-sectional view of the shirring mandrel used in the apparatus as shown in FIGS. 1 and 2.

Description of the preferred embodiments

Figure 1:
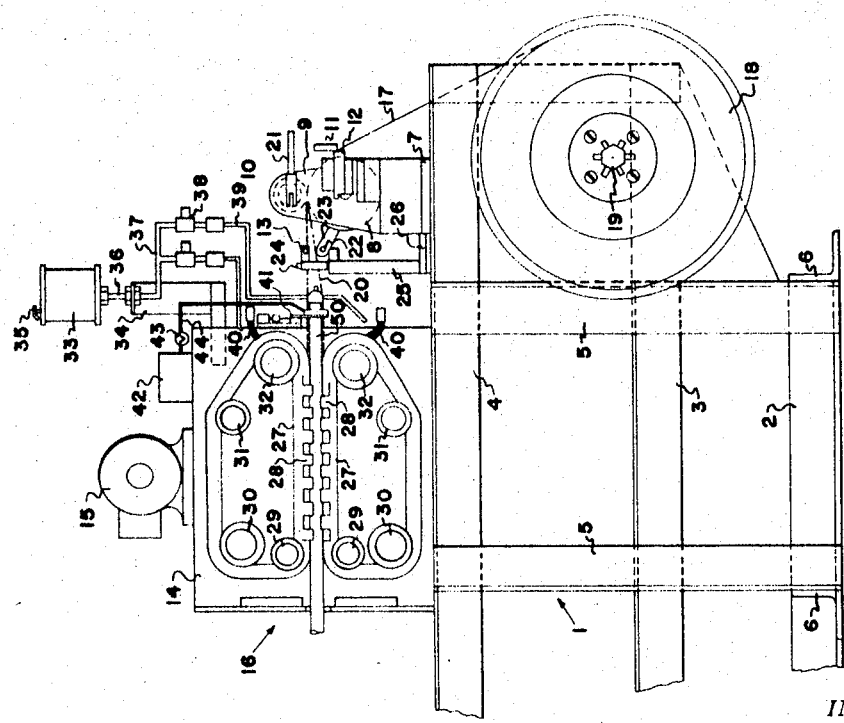
FIG. 1 is a view in elevation of a portion of a shirring machine having the shirring head construction shown in the Blizzard et al. U.S. patents and including a novel mechanism for application of water or other fluid to the casing.

Referring now to FIG. 1 of the drawings, the improved process and apparatus comprising this invention is illustrated as applied to an apparatus of the type shown in the Blizzard et al. patents. In comparing the apparatus of FIG. 1 with the corresponding figure in the Blizzard et al. patent, the same reference numerals are not used for the same parts shown in the patent, but the correspondence of parts and manner of operation will be apparent. In FIG. 1, there is shown an angle iron welded frame which includes a bottom longitudinal angle 2, an intermediant longitudinal angle 3, a top longitudinal angle 4, upright angles 5, and transversely extending angles 6. The remaining portions of frame 1 are disclosed in more detail in FIG. 1 of the Korsgaard patent to which reference is made for a more complete understanding of the same.

Mounted on the top supporting angle 4 is plate 7 which carries a measuring roll 8. Measuring roll 8 is rotatably mounted between support plates 9 which also support a rotatable squeeze roll 10. Cooperating with measuring roll 8 is metering disc 11 that is arranged to operate a measuring limit switch 12 for stopping further operation of the shirring head when a predetermined length of casing has been shirred.

In the Blizzard et al. and the Korsgaard patents, there is explained in greater detail the employment of a tear limit switch for stopping further operation of the shirring head in the event that the casing becomes torn. The tear limit switch is operated by roller 13 which engages the upper side of the inflated casing.

Mounted on the angle iron frame 1 are shirring head side plates 14 which constitute the frame work for the shirring head, further details of which will be described hereinafter. Mounted on side plates 14 is a shirring head motor 15 that is suitably controlled for starting, driving, and stopping the shirring head which is generally referred to as 16.

Shirring head 16 is arranged to receive a relatively thin-walled synthetic sausage casing 17 from reel 18 that is rotatably mounted on shaft 19. As the casing 17 comes from reel 18, it is flat, and sometimes referred to as reel stock. The casing passes between measuring roll 8 and squeeze roll 10 and then is inflated as shown at 20. Squeeze roll 10 is removed into and out of position by handle 21. Immediately below roller 13 which operates the tear limit switch and on the under side of inflated casing 20 is a roller 22 carried by arm 23. Roller 22 is employed to limit the downward movement of roller 13 when the casing is deflated. The casing is drawn over a mandrel 50 which has a central longitudinal aperture through which air flows under a slight pressure to inflate the casing to its full diameter and thus facilitate the shirring operation and the application of fluid through the novel applicator. The central aperture in the shirring mandrel also provides an opening for introduction of oil or other lubricant or for the introduction of water to the interior of the casing.

The inflated casing 20 is directed into shirring head 16 between guide rolls 24 which are mounted on vertical supports 25 secured to and extending from arms 26 on plate 7. Using shirring head 16 constructed as herein disclosed and with appropriate changes in the openings and the shirring dogs or lugs, it is possible to shirr a wide range of sizes of synthetic sausage casings. The casings with which this invention can be employed range in thickness from 1–4 mills and in length from about 30–200 ft. While the reel 18 contains an indeterminant length of casing, the casing wound thereon is cut into lengths of the order of 30–200 ft. depending upon the requirements of the meat packer. The casing is shirred to the desired length, severed, and the shirred casing removed from the machine. The internal diameter of the casing with which this apparatus can be employed ranges from about ½ to about 1⅞ in. While the apparatus is used primarily in the shirring of cellulosic casing, it may be used in the shirring of fibrous casing, amylose or starch film casing, collagen film casing, alginate film casing, etc. The shirring head shown in this figure can be used in conjunction with a turret as described in the Korsgaard patent, or a floating mandrel construction as described in the Dietrich patent or other similar arrangements.

Shirring head 16 includes upper and lower shirring belts 27 which have a plurality of staggered, closely spaced shirring dogs or lugs 28. The shirring lugs 28 on the upper belt are preferably offset or staggered with respect to the shirring lugs 28 on the lower belt. The shirring belts 27 are supported on pulleys or wheels 29, 30, 31, and 32. Motor 15 is connected by a drive pulley or other suitable drive mechanism to one of the wheels supporting shirring belts 27 and is operable to drive the belt to shirr the casing 20. Lower shirring belt 27 is driven by a motor and pulley arrangement which is not shown but which can be seen in FIG. 1 of the Blizzard et al. patent. The upper and lower shirring belts 27 are driven in coordination so that shirring lugs 28 engage and shirr casing 20 on shirring mandrel 50. The shirred casing is eventually severed and compressed on a storage mandrel or on the outer end of the mandrel where a floating mandrel is used and then discharged to a suitable storage hopper where the shirred strand is removed and placed in a box for shipment.

A lubricant storage tank 33 is supported by plates 34 and secured to shirring head plates 14. The tank 33 has an inlet opening 35 and bottom outlet opening connected to tubing 36 which is in turn connected to manifold 37. Manifold 37 is connected to valves 38 and outlet tube 39 which are arranged to supply lubricant to brushes 40 which are positioned for engagement with shirring belts 37.

The apparatus is provided with a fluid applicator 41 which is shown in more detail in FIGS. 3 to 6. Fluid applicator 41 is provided with a storage tank 42 for storage of water or other fluids which is to be applied to the inflated casing 20. Tank 42 has an outlet control valve 43 and is connected to a pair of flexible conduits 44, only one of which is shown in the drawing. Water or other liquid from tank 42 is fed through conduits 44 to fluid applicator 41 for application of water or other liquid to the inflated casing.

Figure 4:
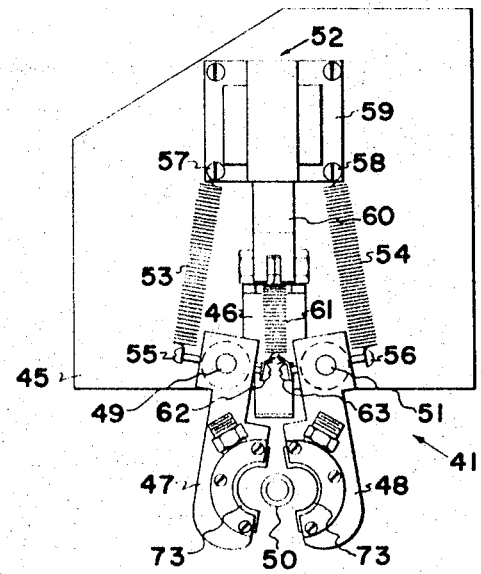
FIG. 4 is a view in elevation of the fluid applicator shown in FIG. 3, in an open position.
Figure 3:
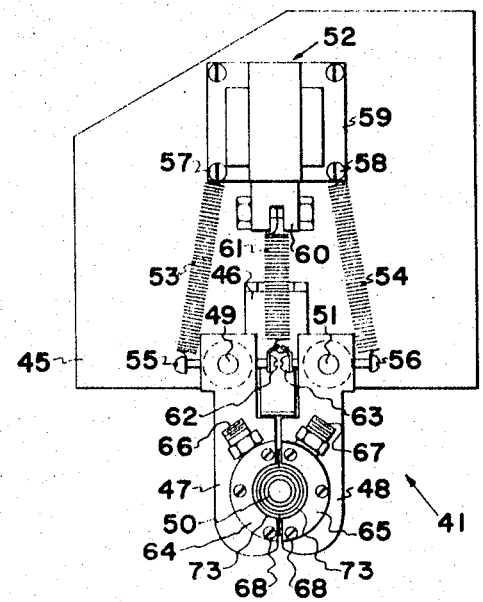
FIG. 3 is a view in elevation of the fluid applicator shown in FIGS. 1 and 2.

In FIGS. 3 and 4 the fluid applicator 41 is shown in more detail. Additional details of part of the applicator construction are set forth in FIGS. 5 and 6. In FIG. 3, applicator 41 is shown to have a supporting plate 45 on which there is secured bracket 46. Supporting members 47 and 48 are pivotally supported on plate 45 as indicated at 49 and 51 respectively. The apparatus is arranged for actuation by a suitable power source, such as an electromagnetic solenoid 52 (other power mechanisms, such as a hydraulic or pneumatic cylinder could be used). A pair of springs 53 and 54 are connected from screws 55 and 56 on members 47 and 48 to screws 57 and 58 on the bracket or support 59 for solenoid 52. The core or plunger member 60 of solenoid 52 is connected to one end of spring 61, the other end of which is connected to screws 62 and 63 on members 47 and 48. In the position shown in FIG. 3, spring 61 urges members 47 and 48 into engagement against the force of springs 53 and 54. When solenoid 52 is de-energized, plunger 60 moves to the extended position shown in FIG. 4 and springs 53 and 54 move members 47 and 48 to the opened position shown in FIG. 4. When solenoid 52 is energized, plunger 60 moves upward and returns the apparatus to the position shown in FIG. 3.

Members 47 and 48 carry capillary fluid applicators for application of water or other fluid to the inflated casing passing therebetween. Members 47 and 48 carry split collar members 64 and 65 which are provided with threaded conduit connections 66 and 67 for connection to conduits 44. The split collar members 64 and 65 are held in place by a plurality of screws 68. Collar member 64 is shown in detail in FIGS. 5 and 6. Collar member 65 is constructed in the mirror image of member 64. Collar member 64 is provided with apertures 69 through which screws 68 extend to secure the collar member on support member 47. Collar member 64 is formed of two sections 70 and 71 respectively. The portion 70 is provided with an annular recess 72. Positioned in recess 72 and in the space between members 70 and 71 and secured in place thereby is a capillary washer 73. Washer 73 is made of a felt material or of a sponge or other similar construction which will transmit water or other fluid for application to the inflated casing on contact therewith.

In operation, the fluid applicator 41 is connected by flexible conduits 44 to tank or container 42 which supplies water or other fluid to be applied to the inflated casing. The solenoid 52 for actuating fluid applicator 41 is connected in circuit to be energized and de-energized simultaneously with the motor 15 which drives shirring belts 27. When motor 15 is energized to rotate shirring belts 27, solenoid 52 is simultaneously energized and the members 47 and 48 moved to the position shown in FIG. 3. In this position, water or other fluid is supplied through conduits 44 to capillary feed washers 73 which contact the inflated casing and apply water or other liquid thereto at a predetermined rate determined by the speed of operation of the shirring head, the fluid head on the water being supplied, and the setting of control valves 43. Whenever the shirring head is stopped by de-energizing motor 15, solenoid 52 is de-energized and plunger 60 moves to the position shown in FIG. 4 to allow members 47 and 48 to move to the position shown therein with capillary fluid applicator members 73 positioned out of engagement with the inflated casing.

Figure 2:
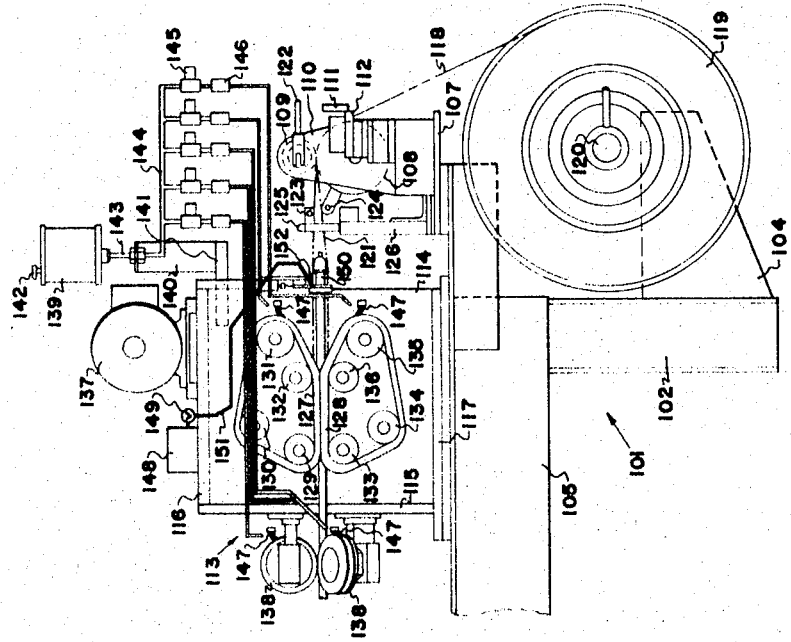
FIG. 2 is a view in elevation of a portion of a shirring machine having a shirring head construction embodying certain features of the Matecki patents and including a novel mechanism for application of water or other fluids to the casing.

In FIG. 2 of the drawings, this invention is applied in a different type of shirring machine. In this shirring machine, shirring wheels are used in place of the belts shown in FIG. 1, and the water is applied through the fluid applicator mechanism positioned adjacent to the feed-in belts on that machine.

In this shirring machine, there is provided a frame which is generally of an angle iron and plate welded construction. Frame 101 includes vertically extending supporting angle 102 and supporting plate 104 for the reel of casing. At the upper edge of frame 101 is transversely extending plate 105 on which there is supported plate 107 carrying measuring roll 108 and squeeze roll 109. Rolls 108 and 109 are mounted on support plates 110. Cooperating with measuring roll 108 is a metering disc 111 which cooperates with a measuring limit switch 112 for stopping further operation of the shirring head when a predetermined length of casing has been shirred.

The shirring head which is generally designated as 113 is supported by upwardly extending plates 114 and 115 and horizontally extending supporting plates 116 and 117. Shirring head 113 is arranged to receive relatively thin-walled synthetic sausage casing 118 from reel 119 which is rotatably mounted on shaft 120 supported on plate 104. As casing 118 comes from reel 119, it is flat in the form of reel stock and passes between measuring roll 108 and squeeze roll 109 and then is inflated as shown at 121. Squeeze roll 109 is adjustable by lever 122 for initial threading of casing into the machine. The inflated casing is fed over shirring mandrel 150 and passes between upper and lower rollers 123 and 124. Roller 123 operates a tear limit switch which stops the shirring head in the event that the casing becomes torn, and roller 124 limits the downward movement of roller 123 when the casing is deflated. The casing also passes between guide rollers 125 mounted on upwardly extending arms 126.

The inflated casing 121 next passes between upper and lower feed belts 127 and 128 which cooperate to form a closed circular passage which assists in feeding the casing to the shirring wheels. Feed belt 127 is guided and driven by rollers 129, 130, 131, and 132. Feed belt 128 is driven in coordination with belt 127 by rollers 133, 134, 135, and 136. The drive rollers for the belts 127 and 128 may be driven by motor 137 mounted on plate 116 at the upper end of shirring head 113 or may be driven by any other suitable motor or power source (not shown).

The inflated casing 121 is fed into a plurality of shirring wheels 138 which are mounted on end plate 115. Shirring wheels 138 are driven by motor 137 or by any other suitable power source. Shirring wheels 138 may be of any suitable design, such as that shown in the Matecki patents or in the Clement Patent 3,266,911 or the Arnold patent application Ser. No. 564,961, or any other suitable design. Casing 121 is shirred on mandrel 150 by wheels 138 and the shirred product removed from the portion of the apparatus to the left of the shirring wheels, which is not shown. Mandrel 150 is relatively fixed in position and is of a generally floating construction.

A fluid storage tank 139 is supported by plates 140 and 141 and is secured to shirring head plates 114. The storage tank 139 has an inlet opening 142 and a bottom outlet opening connected to tubing 143 which is in turn connected to a manifold 144. Manifold 144 is connected to a plurality of valves 145 and outlet tubes 146 which are arranged to supply lubricant to brushes 147. Brushes 147 are positioned for engagement with feed belts 127 and 128 and with shirring wheels 138 for application of oil or other lubricant thereto. The apparatus is also provided with a fluid applicator system for application of water or other fluid to the casing as in the shirring machine shown in FIG. 1. There is provided a water or other fluid storage tank 148 having an outlet control valve 149 and conduit 151 leading to fluid applicator 152. Fluid applicator 152 is identical in structure to fluid applicator 41 which is shown in detail in FIGS. 3 and 4. The fluid applicator is arranged to open and close as described for FIGS. 3 and 4 to provide a metered flow of water or other fluid to be applied to the casing which is drawn through the closed applicator.

In FIG. 7, the mandrel 150 in the shirring machine of FIG. 2 is shown in more detail with particular emphasis upon a novel arrangement for application of oil or other fluids within the casing being shirred. Shirring mandrel 150 includes separate tubular portions 154 and 154$^a$ which are threadedly connected by tubular nipple 155 as shown at 156 and 156$^a$. Mandrel portion 154 has an inlet opening 157 which opens into interior passage 158 which in turn opens into interior passage 159 in tubular nipple 155. A tubular mandrel portion 160 of nylon or Teflon or other suitable plastic material is secured against mandrel portion 154$^a$ by tubular nipple 161$^a$ threadedly connected at 159$^a$. There is a shoulder or drop-off 160$^a$ between members 160 and 154$^a$ and another drop-off 155$^a$ between members 154$^a$ and 154. At the leading end of mandrel 150, there is provided a plastic cup-shaped sleeve member 161 which includes a threaded cup-shaped member 162 threadedly connected to the end of tubular nipple 160$^a$ as indicated at 163. Cup-shaped member 162 is provided with openings 164 through which air or other inflating gas and oil or lubricant or other fluid for coating the interior of the casing is ejected. A washer member 165, which may be of felt, porous flexible plastic (e.g. plastic sponge or foam), or rubber, or other suitable material, is positioned between member 161 and plastic mandrel portion 160. A gas exhaust tube 166 is provided and extends through cup-shaped member 162 and passages 158 and 159 and exhaust gas through outlet passage 167. When casing 121 is inflated and drawn over mandrel 150 in preparation for shirring, the inflating gas is introduced through inlet 157, passages 158 and 159 and openings 164 into the interior of the casing along with oil, lubricant, or othre fluid such as water. The oil, lubricant, water, or other fluid is sprayed through openings 164 and thus applied to the inner surface of inflated casing 121. As casing 121 is drawn over washer 165, the oil or other lubricant or coating fluid is spread by washer 165 to provide a very uniform coating over the inner surface of casing 121. This mandrel and washer arrangement is primarily used for application of a uniform layer of oil or other lubricant within casing 121 but may also be used for application of coating materials within the casing. If desired, additional amounts of water may be added with the oil inside the casing as was described in the Arnold et al. patent.

Figure 8:
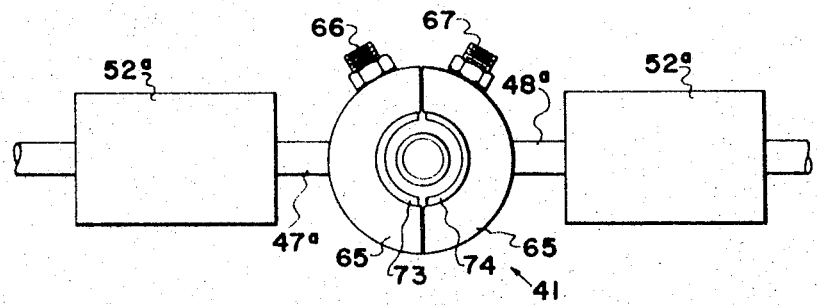
FIG. 8 is a detail view of another embodiment of the actuating mechanism for the fluid applicator.

In FIG. 8, there is shown another embodiment of the fluid applicator wherein the actuator mechanism comprises a pair of pneumatic or hydraulic actuators. Actuator 41 comprises split collar members 64 and 65 having conduit connections 66 and 67 and capillary washer members 73 and 74 as were described with reference to FIGS. 3 to 6. In this arrangement, the split collar members 64 and 65 are supported on pistons 47$^a$ and 48$^a$ which are movable by fluid pressure (e.g. pneumatic or hydraulic) cylinders 52$^a$ and 52$^b$, respectively. When the shirring machine is running, the split collar members 64 and 65 are in closed position, with washer members 73 and 74 engaging the casing, as shown in FIG. 8. When the shirring machine is stopped, actuators 52$^a$ and 52$^b$ move the split collar members 64 and 65 away from each other and out of engagement with the casing.

Figure 9:
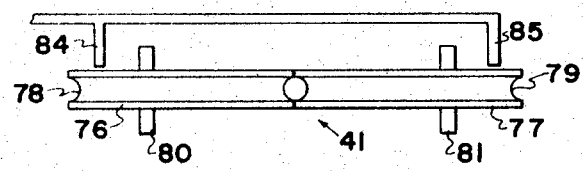
FIG. 9 is a detail view of another embodiment of the fluid applicator.
Figure 10:
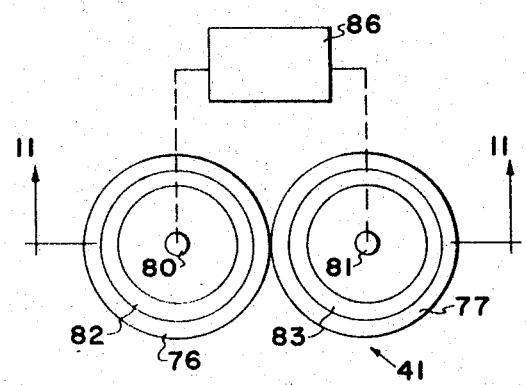
FIG. 10 is a plan view of the fluid applicator shown in FIG. 9.
Figure 11:
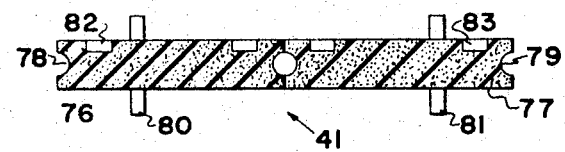
FIG. 11 is a cross-sectional view taken on the line 11—11 of FIG. 10.

In FIGS. 9, 10, and 11, there is shown still another embodiment of the invention utilizing a modified fluid applicator. The fluid applicator 41 comprises a pair of rolls 76 and 77 having peripheral grooves 78 and 79, and mounted for rotation on shafts 80 and 81, respectively. Rolls 76 and 77 are formed of a porous capillary material, such as a sponge or foamed plastic, or may comprise such material within a suitable rigid support. Rolls 76 and 77 are provided with annular grooves 82 and 83, respectively, in the upper faces thereof positioned to receive water or other fluid from conduits 84 and 85 (which correspond to conduits 44 or 151 in FIGS. 1 and 2, respectivelly). If needed, the rolls 76 and 77 may be movably mounted for actuation by an actuator indicated diagrammatically as 86. Rolls 76 and 77 are positioned horizontally and mounted at the input end of the shirring machine (in place of fluid applicator 41) with the inflated casing passing between the rolls or at the ouptut side of the shirring machine with the rolls contacting the shirred strand of casing for application of fluid thereto. Rolls 76 and 77 are waterproof along their lower surfaces and their outer peripheral surfaces (except for grooves 78 and 79) to confine and feed water to the grooves.

In the operation of this embodiment of the invention, water or other fluid is fed through conduits 84 and 85 to annular grooves 82 and 83 in rolls 76 and 77. The water or other fluid is fed from the annular grooves through the porous capillary structure to the peripheral grooves 78 and 79 for contact with the inflated casing or with the shirred casing (depending upon the location of the rolls). The rolls 76 and 77 rotate freely by frictional contact with the inflated casing (or shirred strand) passing therebetween and continuously and uniformly meter water or other fluid to the casing. In an intermittently operated shirring machine, actuator 86 moves the rolls 76 and 77 out of contact with the casing whenever the machine is stopped.

While this invention has been described with special emphasis upon certain preferred embodiments, it should be understood that within the scope of the appended claims the invention may be practiced otherwise than as specifically described herein.

What is claimed is:

1. In a shirring machine comprising a mandrel, means to feed tubular casing over said mandrel, means to inflate the casing on said mandrel, and means to shirr said inflated casing, the improvement which comprises means supported adjacent to said mandrel and movable into and out of engagement with the casing around substantially the entire periphery thereof to apply a liquid thereto.

2. A shirring machine according to claim 1 which includes means to move said liquid applying means out of engagement with said casing when the shirring means is stopped.

3. A shirring machine according to claim 2 in which said liquid applying means comprises at least one porous capillary wiping member.

4. A shirring machine according to claim 2 in which said liquid applying means comprises a pair of members supported for movement split collar members supported one on each of said movable members split porous capillary collar members positioned one in each of said split collar members means to supply liquid to each of said porous members and means to move said movable members to move said collar members into and out of engageent surrounding said casing.

5. A shirring machine according to claim 4 in which said last named moving means comprises electrically energized means energized and de-energized in association with the starting and stopping of said shirring means.

6. A shirring machine according to claim 4 in which said last named moving means comprises fluid actuated means energized and de-energized in association with the starting and stopping of said shirring means.

7. In a shirring machine comprising a mandrel, means to feed tubular casing over said mandrel, means to inflate the casing on said mandrel, and means to shirr said inflated casing, the improvement which comprises at least two capillary wiping members supported adjacent to said mandrel and engageable with the casing around substantially the entire periphery thereof to apply a liquid thereto.

8. A shirring machine according to claim 7 in which said capillary wiping members comprise rotary porous members engageable with said casing to apply fluid thereto upon movement of casing therebetween.

9. In a shirring machine comprising a mandrel, means to feed tubular casing over said mandrel, means to inflate the casing on said mandrel, and means to shirr said inflated casing, the improvement which comprises a hollow shirring mandrel with openings at one end for introduction of an inflating gas and other fluid into the inflated casing, and a flexible washer member positioned on said mandrel behind said openings in relation to the direction of travel of said inflated casing, and engaging and wiping the inner surface of said inflated casing to spread said fluid uniformly thereon.

References Cited

UNITED STATES PATENTS

| | | | |
|---|---|---|---|
| 1,492,697 | 5/1924 | Neuberth | 17—42 X |
| 1,876279 | 9/1932 | Dietrich | 17—42 |
| 2646,592 | 7/1953 | Kennedy | 17—42 |
| 3,115,669 | 12/1963 | Matecki | 17—42 |
| 3,158,896 | 12/1964 | Marbach | 17—45 |
| 3,222,192 | 12/1965 | Arnold et al. | 17—42 X |
| 3,315,300 | 4/1967 | Ziolko | 17—42 |
| 2,148,550 | 2/1939 | Haase. | |

LUCIE H. LAUDENSLAGER, Primary Examiner

U.S. Cl. X.R.

17—45; 99—176

UNITED STATES PATENT OFFICE
CERTIFICATE OF CORRECTION

Patent No. 3,462,794         Dated August 26, 1969

Inventor(s)   Thomas W. Martinek

It is certified that error appears in the above-identified patent and that said Letters Patent are hereby corrected as shown below:

Column 2, line 26, "2,020,626" should read -- 2,010,626 --; line 28, "pleates" should read -- pleats --; line 57, "machines" should read -- machine --. Column 3, line 43, "position" should read -- portion --. Column 5, line 17, "removed" should read -- moved --; line 38, "mills" should read -- mils --. Column 8, line 46, "othre" should read -- other --. Column 9, line 12, "respectivelly" should read -- respectively --. Column 10, line 3, after "movement" insert a comma; line 4, after "members" insert a comma; line 6, after "members" insert a comma; line 7, after "members" insert a comma; line 9, "engageent" should read -- engagement --.

Signed and sealed this 6th day of June 1972.

(SEAL)
Attest:

EDWARD M. FLETCHER, JR.          ROBERT GOTTSCHALK
Attesting Officer                Commissioner of Patents